April 21, 1925.                    1,534,956
J. R. HUGHES
TOY VEHICLE
Filed July 23, 1924

J. R. Hughes
INVENTOR

BY Victor J. Evans
ATTORNEY

WITNESS:

Patented Apr. 21, 1925.

1,534,956

UNITED STATES PATENT OFFICE.

JOHN R. HUGHES, OF HOBOKEN, NEW JERSEY.

TOY VEHICLE.

Application filed July 23, 1924. Serial No. 727,787.

*To all whom it may concern:*

Be it known that I, JOHN R. HUGHES, a citizen of the United States, residing at Hoboken, in the county of Hudson and State of New Jersey, have invented new and useful Improvements in Toy Vehicles, of which the following is a specification.

This invention relates to toy vehicles and has for its object the provision of a novel device upon which a child may sit, the device being provided with means for effecting propulsion by an arm movement, the advantage being that the device will be not only amusing and entertaining in use, but also of great benefit in developing the arm muscles.

An important object is the provision of a wheeled vehicle having hand crank operating means located conveniently in advance of the seat whereby the child using the device may effect propulsion in a natural and easy manner which will avoid strain of any kind while bringing the muscles into play and effecting development thereof.

An additional object is the provision of a device of this character which will be simple and inexpensive in manufacture, easy to operate and control, positive in action, efficient and durable in service, and a general improvement in the art.

With the above and other objects and advantages in view, the invention consists in the details of construction, to be hereinafter more fully described and claimed, and illustrated in the accompanying drawings, in which:

Figure 1:
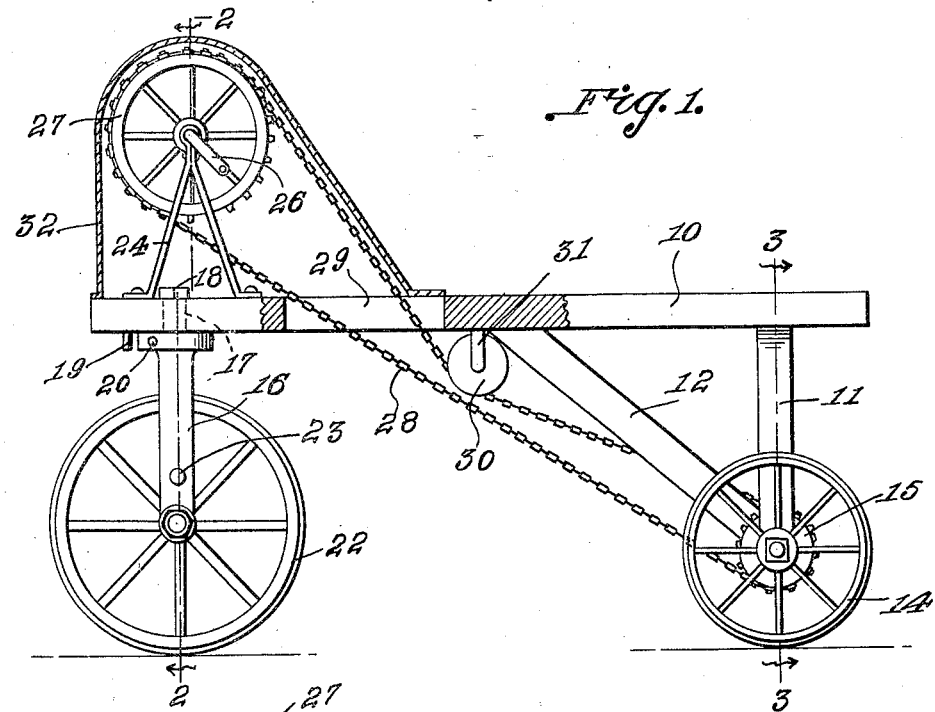
Figure 1 is a side elevation.
Figure 2:
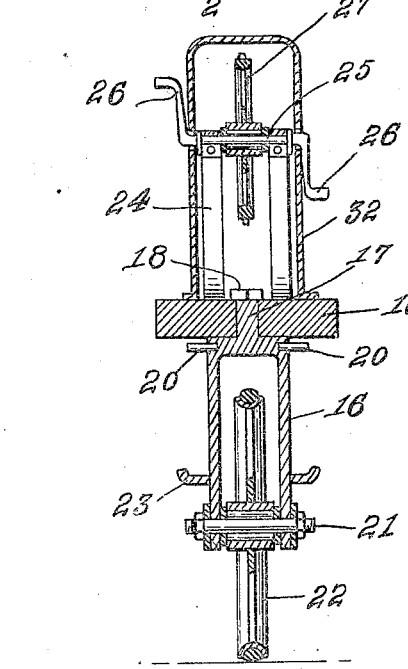
Figure 2 is a section on the line 2—2 of Figure 1.
Figure 3:
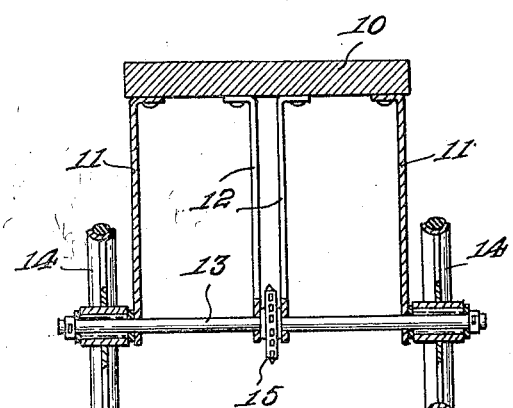
Figure 3 is a section on the line 3—3 of Figure 1.

Referring more particularly to the drawings, I have shown my device as comprising a base or platform 10 which forms a support for the mechanism and which also serves as a seat for the rider. Secured upon the underside of said base or platform at the rear end thereof are depending brackets 11 and 12 spaced in some suitable manner and forming bearings for the rear axle 13 which carries ground engaging wheels 14. In devices of this general class it is customary to secure one wheel to the axle and allow the other to run free so as to avoid binding when making turns. The wheels may of course be of any desired size and construction and may be of wood, metal, wire or the like and may or may not be equipped with rubber tires, as preferred. Secured on the axle 13 is a sprocket 15 which is located between the bracket 12 and which is prevented from longitudinal movement thereby.

At the forward end of the base or platform, I provide a fork 16 formed with an extension or stem 17 journaled through the platform or base and equipped with a nut 18 or the like for preventing disassociation. The turning movement of this fork is preferably limited by means of a depending stop 19 secured to the base or platform and engageable by a pair of pins 20 which project laterally from the fork. Carried by this fork is a suitable spindle or axle 21 upon which is mounted a dirigible wheel 22 whereby steering may be effected and projecting from the outer sides of the fork are foot rests 23 by means of which the turning movement is effected.

Secured upon the top of the forward end of the base or platform are bearing brackets 24 through which is journaled a shaft 25 having hand cranks 26 thereon arranged oppositely as shown. Rigidly secured in some suitable manner upon this shaft 25 is a sprocket 27 which is prevented from longitudinal movement by the bracket and about which is trained a chain 28 which extends through a suitable opening 29 in the platform or base and which is trained about the above described sprocket 15. It is preferable to provide a grooved guide roller 30 journaled within a suitable bracket 31 on the underside of the platform, which guide roller engages the upper stretch of the chain as shown.

To prevent injury to the child using the device, and to prevent damage to the clothing, I provide a casing 32 of suitable size, shape and material and of any desired finish secured upon the top of the platform and enclosing the sprocket and chain as shown.

In the use of the device, the child sits upon the rear portion of the platform 10 and grasps the crank handles 26 in his hands. When turning movement is imparted to the axle or spindle 25, it is apparent that the vehicle will be propelled along the ground. Steering is effected by turning the fork 16 by pressing upon the proper one of the foot rests 23 in an obvious manner.

From the foregoing description and a study of the drawings, it will be apparent that I have thus provided a simply constructed, inexpensive and very entertaining and amusing toy vehicle which will at the same time be of great benefit in developing the arm muscles of children. Owing to the simplicity of the construction, it is evident that there is very little to get out of order so that the device should have a long and satisfactory life.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

A device of the character described comprising a platform, a plurality of brackets depending from the rear ends thereof, an axle journaled through said brackets, ground engaging wheels on said axle, one wheel being fast and the other loose, a sprocket on the axle, a dirigible front wheel, brackets rising from the forward ends of the platform, a shaft journaled through the last named brackets and having hand cranks thereon, a sprocket on the shaft, a chain trained about both sprockets, the platform being formed with an opening for the accommodation of the chain, a guide roller depending from the platform and engaging the upper stretch of the chain, and a housing secured upon the top of the forward portion of the platform and enclosing the sprocket at the forward end and also enclosing that portion of the chain extending above the platform.

In testimony whereof I affixed my signature.

JOHN R. HUGHES.